United States Patent Office 3,349,681
Patented Oct. 31, 1967

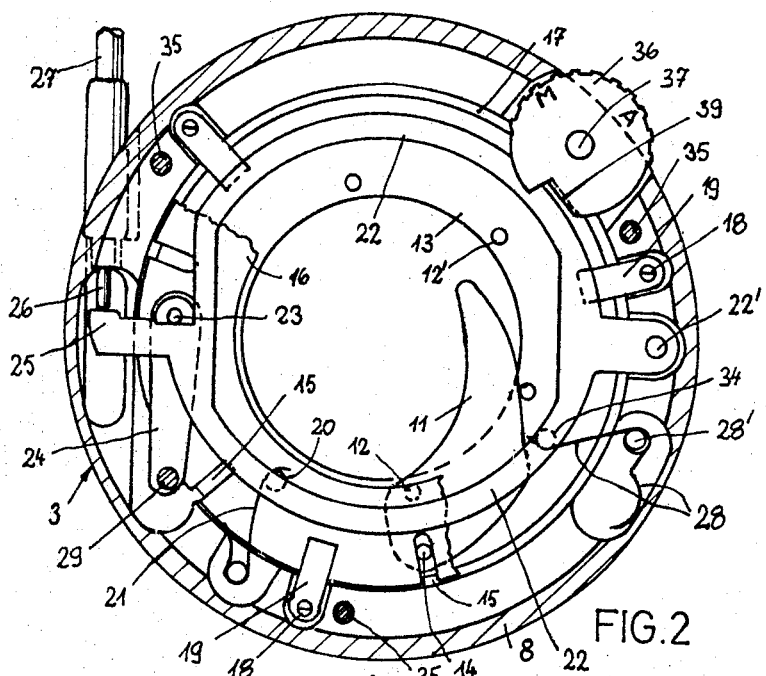
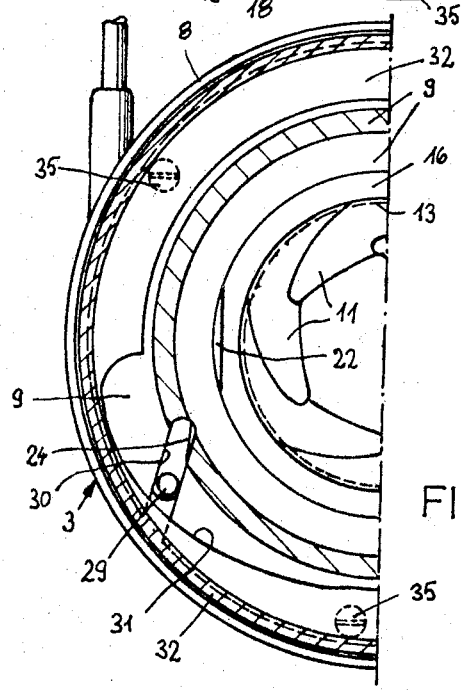

3,349,681
PHOTOGRAPHIC RECORDING LENS SYSTEM WITH FULLY AUTOMATIC DIAPHRAGM OPERATION
Ferdinand Kellner, 8941 Hart 14¼, near Memmingen, Bavaria, Germany
Filed Aug. 10, 1964, Ser. No. 388,496
Claims priority, application Germany, Sept. 14, 1963, N 23,750
3 Claims. (Cl. 95—64)

This invention relates to a photographic recording lens system with fully automatic diaphragm operation and freely pivotable lamellae.

Monocular reflex cameras are known whose lens systems are provided with atuomatic diaphragms which allow to set the camera with the diaphragm being opened, which diaphragm then closes to a pre-determined value in the moment of exposure.

Automatic diaphragms are most common before all with lens systems with short focal length. In cameras with focal plane shutters the lens systems are in general interchangeable and may be used also for making close-ups if a bellows setting device is used. If the lense system is provided with a connection nipple for a wire release, the automatic diaphragm may be operated by means of a double-wire release in such a way that it closes shortly before the shutter motion. The possibility to set the camera with the diaphragm being fully opened is in this case particularly advantageous since the focussing screen is already darker because of the lerge lense extension necessary for close-ups.

It is, however, disadvantageous that these lens systems which may be directly used in combination with the camera, are provided with a permanently incorporated setting mount. If such a lens system is used with a bellows device, the lens extension becomes so large because of the space required by the bellows device, that photographs are only possible from very short distances in the scale 1:1 and bigger. Infinitely adjustments are no longer possible.

Finally lens systems are known and widely used which have approx. the double focal length of the normal lens system used in combination with the camera. These lens systems are produced without setting mount as so-called lens system heads and are used in bellows-setting devices. The bellows-setting device serves in this case as setting mount. The picture range extends in general from infinity to the scale 1:1. Since a special setting mount is not required at the lens system, these lens system heads may be produced relatively cheap.

The disadvantage of these lens systems or lens system heads respectively is that the diaphragm must be closed during use by hand since the lens system is not provided with an automatic diaphragm. For many exposures and e.g. for taking a shot of an insect in a flower, in which case a small diaphragm must be used and the shot be taken free-handed a setting of the camera with full diaphragm opening and a closing of the diaphragm by hand before the exposure is not possible. The setting must be done with the diaphragm to be used and the focussing screen, therefore, is very dark because of the necessary strong stepping down and because of the lengthened lens extension. The setting is difficult and can often not be effected. This results in the fact that in many cases exposures can only be effected with an automatic diaphragm so that the automatic diaphragm is not only an operating facility, but a necessary prerequisite for many exposures.

It is an object of the invention to provide a photographic recording lens system with fully automatic diaphragm operation which is adapted to the particular conditions of bellows-setting devices and whose production costs are low.

The invention departs from a photographic recording lens system with fully automatic diaphragm operation and freely oscillating lamellae and is characterized in that the lens system consists essentially of three parts, i.e. of a front lens set, a diaphragm body and a back lens set, the diaphragm body containing all elements for the fully automatic diaphragm operation and the distance between the abutments of the two threaded lens sets at the diaphragm body being 20 mm. so that the diaphragm body can be exchanged with a central shutter body or a diaphragm body for non-automatic diaphragm operation of traditional construction.

The invention departs from the consideration that a bellows-setting device is in general combined with a diaphragm body for non-automatic diaphragm operation of traditional construction or with a central shutter body. If it becomes possible to use substantial components of these existing equipments for the recording lens system with fully automatic diaphragm operation according to the invention, the manufacturing requirements for the recording lens system according to the invention may be reduced decisively. The invention profits in this respect from the fact that the diaphragm mount of the lens system heads used in combination with bellows-setting devices, are in general interchangeable with central shutter and that therefore the distance and the threading of the two lens mounts is nearly always identical in these lens system heads since they are standardized according to the conditions of the central shutters. The distance of the abutments of the lens sets in a central shutter amounts to 20 mm. in this case. The position of the focal plane is also identical in all these lens system heads.

The invention, therefore, makes use of the lens sets of existing lens system heads to build under additional use of a diaphragm body the recording lens system with automatic diaphragm operation according to the invention.

In a preferred embodiment of the invention only the lamellae and their bearings as well as the diaphragm ring moving the lamellae are arranged within the space between the two lens sets. The elements for controlling the diaphragm ring are on the contrary arranged in the space at the exterior of the front lens set.

In a recording lens system according to the invention the space conditions are very restraint. Only the space is at disposal which, in general, is sufficient for the arrangement of a diaphragm body with a non-automatic diaphragm. In the problem according to the invention, however, not only the space between the lens sets is limited, i.e. the space in the direction of the optical axis. Because of the construction elements of the bellows-setting device the diameter of the diaphragm body can also not be chosen as big as desired. These difficulties are eliminated according to the invention that only specific elements are arranged between the lens sets whereas the other elements are, on the contrary, arranged in the space at the exterior of the front lens set.

The diaphragm casing of the diaphragm body is comprised preferably of two parts, the one part supporting the back lens set and receiving in an annular recess open to the front the lamellae and their control elements. This recess is covered by the lower part of the diaphragm casing which again supports the front lens set and the diaphragm setting ring.

The recording lens system according to the invention is particularly arranged as a fully automatic pressure diaphragm with a diaphragm ring biased by a spring. The invention provides in this respect for a spring biasing the diaphragm ring into the closing position and for a stop which may be displaced by means of a wire release against the action of a spring in the closing direction of the diaphragm ring, which stop is configured as a ring which extends around the front lens set. Because of the above-mentioned limited space conditions it is highly difficult to arrange a ring in the diaphragm body which is sufficiently long in order to provide a sufficient linear movement with its extremity, to ensure that the push-pin of the wire release securely engages with this ring and does not slide off. It has been found that these difficulties can be avoided by utilizing a ring which extends around the front lens set. The ring moved by the wire release serves as a pivotable stop for the diaphragm ring controlling the lamellae, the diaphragm ring being also biased by a spring.

According to a further feature an inverter acts upon the ring which serves for the switching over from automatic to non-automatic diaphragm operation. This inverter displaces the ring against the force of its spring into its end position so that the diaphragm closes and may only be effected by the diaphragm setting ring respectively.

For limiting the closing movement of the diaphragm ring a rocker arm is journalled at the diaphragm ring by means of a pin which extends through an oblong hole in the covering diaphragm casing part and cooperates with a helicoidal track at the diaphragm setting ring. The oblong hole has such a position that it encloses an acute angle with the radial line. The pin is allowed to slide outwardly more or less according to the position of and by this helicoidal track and the rocker arm carrying the pin thus determines the position of the diaphragm ring and thus the position of the lamellae.

The invention will be best understood upon consideration of the following detailed description of an illustrative embodiment when read in conjunction with the accompanying drawing in which:

FIG. 2 shows a section through the embodiment according to FIG. 1 in another scale according to the section line II—II; and FIG. 3 shows a partial section through the embodiment of FIG. 1 according to the section line III—III in the same scale as FIG. 2.

Figure 1:
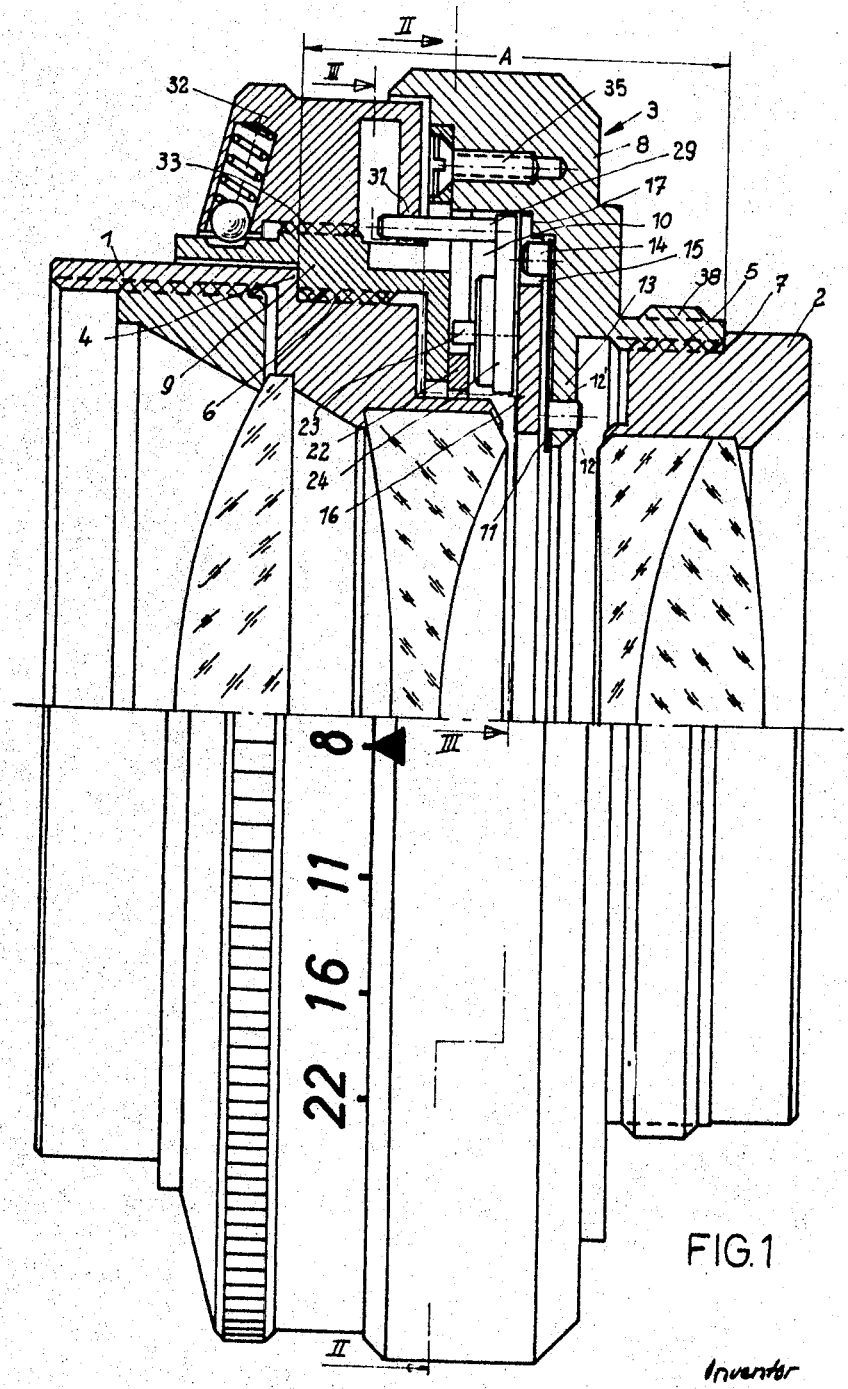
FIG. 1 shows an enlarged lateral view and a partial section through a recording lens system according to the invention.

The lens system according to the invention consists of three main parts, i.e. the diaphragm body 3, the front lens set 1 and the back lens set 2, which are screwed into the diaphragm body 3 by means of threads 5 and 6. The front lens set 1 abuts at shoulder 4, and the back lens set 2 at shoulder 7. The distance A between these two shoulders amounts to 20 mm.

The diaphragm body 3 is built up by the two diaphragm casing parts 8 and 9 which are connected with each other by means of screws 35. A recess 10 is provided in the diaphragm casing part 8 which receives all elements necessary for controlling the lamellae or blades 11.

The lamellae 11 engage with their pin 12 into bearing holes 12' of the annular bearing plate 13 of the casing part 8. The lamellae 11 support further pins 14 which are guided in slot-like guides 15 of the diaphragm ring 16. This diaphragm ring 16 engages with the shoulder 17 of the casing part 8 and is held for rotation in the diaphragm casing by means of platelets 19 fastened with screws 18.

Reference is made to the fact that in FIG. 2 only a part of the diaphragm ring 16 and only one of the 6 lamellae 11 have been shown.

A pin 20 is fastened on the diaphragm ring 16 which is engaged by a resilient actuating member here shown as a leaf spring 21 supported in the casing, which tends to rotate the diaphragm ring into the closing position. The diaphragm ring is on the other hand prevented from effecting this movement by an annular actuating lever, with which it engages with pin 23. Pin 23 furthermore serves for supporting a rocker arm 24 on the diaphragm ring. This rocker arm constitutes another actuating member for the ring 16.

The outer extremity 25 of the annular lever 22 supported at 22' cooperates with the push pin 26 of the wire release 27 and spring 28 furthermore acts upon the annular lever, which spring biasses the annular lever against pin 23 and against push pin 26. Spring 28 is supported at 28' at the casing part 8. One extremity of the spring engages with pin 34 of the annular lever and the other extremity with the casing part 8.

It is obvious that, when the annular lever 22 is rotated by the push pin 26, anticlockwise as seen in FIG. 2, pin 23 and, therefore, the diaphragm ring 16 may follow this movement so that spring 21 brings the diaphragm ring and the lamellae into the closing position.

In order to be able to set the diaphragm to a predetermined value, a further actuating member 29 constituted by a follower pin 29 is fastened at the rocker arm 24 which extends through an oblong opening or hole 30 (FIG. 3) of the casing part 9 and which cooperates with the helicoidal track 31 of the diaphragm setting ring 32. This helicoidal track 31 limits the outward movement of pin 29 in the oblong hole 30 and thus limits the closing movement of the diaphragm ring 16.

The inverter has been designed with the reference number 36 and its pivot with 37. After the switching over to non-automatic diaphragm operation the inverter nose 39 pushes against the annular lever 22 and displaces it in its end position. The diaphragm setting ring 32 is rotatable on the setting thread 33 of the casing part 9 and the whole lens system may be screwed into the bellows-setting device by means of a thread 38.

What we claim is:

1. In a photographic camera, threaded coaxial front and rear lens sets having central openings; and an automatic diaphragm including an annular body disposed between and comprising front and rear threads respectively meshing with and being separable from said front and rear lens sets, said body having an annular recess extending radialy inwardly of said front threads close to said openings and radially outwardly beyond said front threads, stop means provided on said body and abutting against said lens sets to fix the axial spacing between said lens sets, the distance between said stop means being 20 mm., a diaphragm ring rotatably mounted in said recess, freely oscillating blades articulately connected with said body and movable by said diaphragm ring between open and closed positions, and actuating members provided in said recess for rotating said diaphragm ring, said actuating members including resilient means for biasing said diaphragm ring in a direction to move said blades to closed position and spring-biased lever means engageable with said diaphragm ring to hold said blades in open position, and wire release means for moving said lever means.

2. A structure as defined in claim 1, wherein said lever means comprises an annulus surrounding a portion of said front lens set.

3. A structure as defined in claim 1, further comprising inverter means for disengaging said lever means from said diaphragm ring and manually operated setting means for rotating said diaphragm ring upon disengagement of said lever means.

References Cited

UNITED STATES PATENTS

| | | | |
|---|---|---|---|
| 2,821,891 | 2/1958 | Gorey | 95—64 |
| 2,917,983 | 12/1959 | Gebele | 95—64 |
| 2,949,837 | 8/1960 | Baab | 95—64 |
| 3,051,065 | 8/1962 | Kobayashi | 95—64 |
| 3,084,608 | 4/1963 | Kobayashi | 95—64 |

FOREIGN PATENTS 203,357   5/1959   Austria.

NORTON ANSHER, *Primary Examiner.*

J. PETERS, *Assistant Examiner.*